Nov. 13, 1951 E. D. JOHNSON 2,575,277
GEAR SHIFT AND THROTTLE CONTROL SYSTEM
Filed Sept. 22, 1947 2 SHEETS—SHEET 1
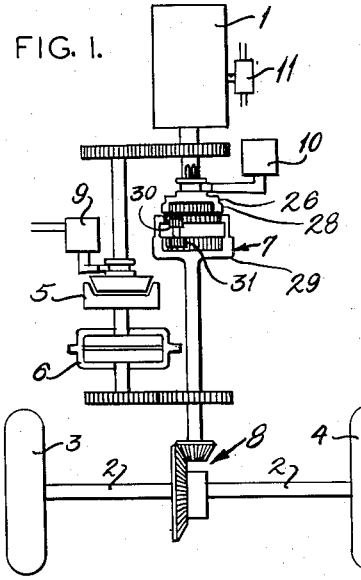
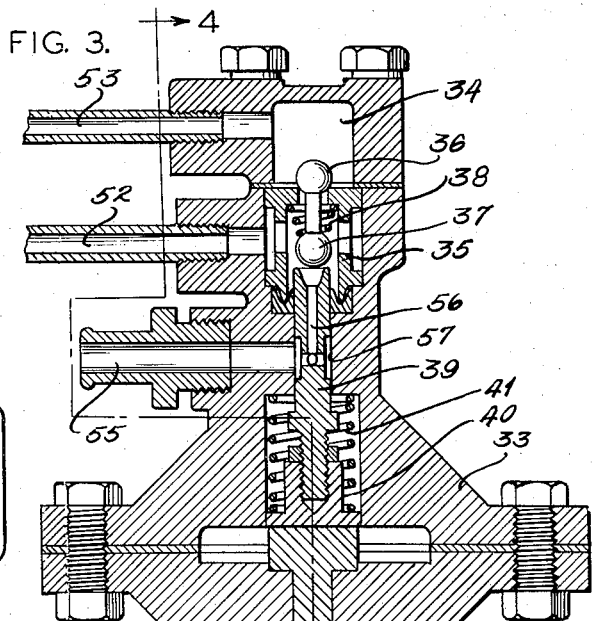
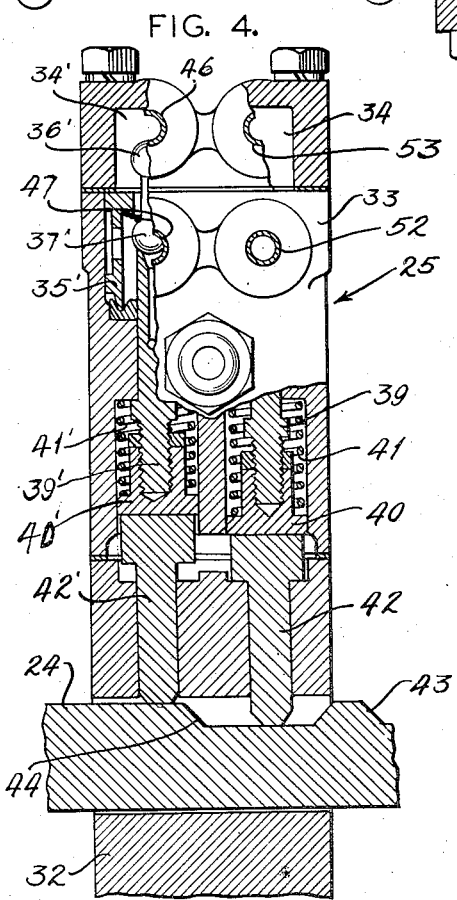
INVENTOR:
EDWARD D. JOHNSON
HIS ATTORNEYS.

INVENTOR:
EDWARD D. JOHNSON

HIS ATTORNEYS.

Patented Nov. 13, 1951

2,575,277

UNITED STATES PATENT OFFICE 2,575,277

GEAR SHIFT AND THROTTLE CONTROL SYSTEM

Edward D. Johnson, St. Louis, Mo., assignor to Wagner Electric Corporation, St. Louis, Mo., a corporation of Delaware Application September 22, 1947, Serial No. 775,390

4 Claims. (Cl. 192—.08)

This invention relates to automotive vehicles and is more particularly directed to a control system for automatically regulating the throttle and consequently the engine speed and other mechanisms and movements required to complete a reversible shift cycle in an automotive vehicle.

It is an object of this invention to provide control means for mechanisms which operate the clutch, select the drive ratio and regulate engine speed during any engine speed to final drive speed ratio change and in which the control means interlocks and times the mechanisms so as to impart to the vehicle a driver reaction or feel resulting in maximum passenger comfort.

Another object of this invention is to provide a regulated source of pressure fluid for a pressure fluid circuit for a pressure fluid operated motor that actuates the control means that governs the operation of the ratio selector and the engine controlling device so that they perform in a precision manner.

The preferred embodiment discloses a connection between the engine and final drive which consists of either a torque converter, or fluid drive, or a gear train, or overdrive. It is not, however, proposed to limit the scope of this invention to these methods of securing various speed and torque ranges because the method is equally applicable with constant mesh variable gear driver, or selective crash-gear driver, or any other well-known types of transmissions.

In the drawings:

Figure 1 shows a schematic diagram of required elements for one engine and dual power train transmission system embodying this invention for an automotive type vehicle.

Figure 3 is a vertical section of the application valve, and

Figure 4 is a partial sectional diagram taken along the line 4—4 of Figure 3.

Figure 2:
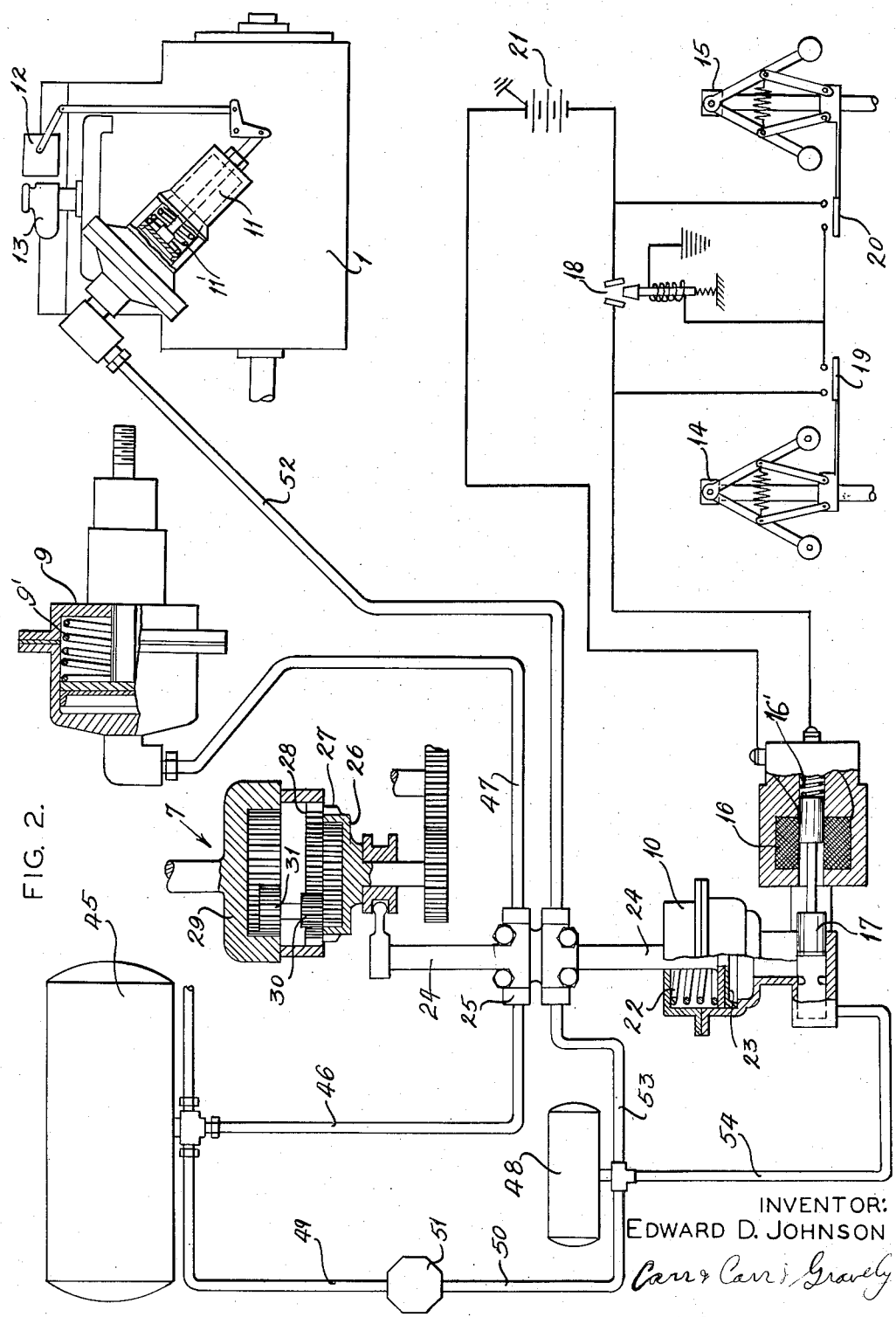
Figure 2 shows a schematic diagram of the various pressure fluid and electrical circuits required in the control system.

Referring to the structures shown in Figures 1 and 2, the system comprises an engine 1 which drives the traction wheels 3 and 4 of an automotive type vehicle by means of axles 2, 2 and a differential 8 through the appropriately selected torque means of either clutch 5 and torque converter 6 which is preferably a fluid coupling, or the direct or overdrive gear train 7. Throttle 12 associated with carburetor 13 of engine 1 is controlled by pressure fluid operated spring returned motor 11. Engagement of clutch 5 is controlled by pressure fluid operated spring returned motor 9 and the overdrive assembly 7 by pressure fluid operated spring returned motor 10.

The cycle of operation for motors 9, 10 and 11 is initiated by speed variations of the vehicle or engine and such a cycle is started when the low and high speed governors 14 and 15, respectively, are actuated. Low speed governor 14 operates switch 19 to complete one holding coil circuit for main switch 18 which controls the solenoid 16 and consequently all other subsequent operations. High speed governor 15 operates the momentary switch 20 for this solenoid circuit and until the vehicle or engine speed reaches a predetermined value, the circuit is not complete. Once the circuit is established by the operation of high speed governor 15 closing switch 20, the main control switch 18 is closed and thus electrical energy can flow from the battery 21 through the solenoid circuit 16 to permit the admission of pressure fluid into the solenoid operated shift cylinder 10. The operation of the high speed governor 15 controls the connection of the engine to the final drive through the overdrive 7. The low speed governor controls the removal of the overdrive 7 and the connection of the torque converter 6 with the corresponding clutch 5 and fluid drive with the drive wheels 3 and 4.

Solenoid operated shift cylinder 10 has a piston 23 therein which is connected to piston rod 24. Piston rod 24 is provided with cams 43 and 44 (Figure 4) cooperating with push rods or tappets 42 and 42' in valve 25 as well as being suitably connected to shiftable member 26 of overdrive 7. The final drive gear 29 of the overdrive is driven by the shiftable member 26 through suitably supported cluster gears 30 and 31. The members 26 and 29 are provided with well-known synchronizing combs 27 and 28, respectively, to prevent gear clashing during shifting operations. Pressure fluid for actuating solenoid operated shift cylinder 10 is provided from reservoir 48 by means of conduit 54.

Spring 22 in the solenoid operated shift cylinder 10 returns the piston 23 therein to the position shown in Figure 2 when valve 17 is closed, thereby enabling the pressure fluid in the shift cylinder 10 to be exhausted to atmosphere through a port (not shown).

Piston rod 24 cooperates with application valve 25 to selectively control the actuation of throttle control assembly 11 and clutch control cylinder 9. The base 32 of the cam operated application valve 25 is provided with a suitable opening in which piston rod 24 operates. The body 33 is suitably secured to the base 32 and houses two identically constructed valve structures which are operated in a definitely preselected timed sequence by the cams 43 and 44 formed in the piston rod 24. Cam 43 cooperates with the valve structure to control the flow of pressure fluid through the conduits 52 to the throttle control assembly 11. Cam 44 cooperates with that portion of the cam operated application valve 25 to control the pressure fluid in conduit 47 to the clutch control cylinder 9.

The construction of this cam operated application valve is as shown in Figures 3 and 4 of the drawings and has a chamber 34 in the upper part of the housing. The lower end of the chamber 34 receives a valve cage 35, also provided with a chamber. The inlet and exhaust valves 36 and 37 are mounted on a common joining member arranged in the valve cage 35 with valve 36 engageable in a normally closed position by the action of spring 38 with the seat formed on the cage. Valve 37 is engageable with a seat formed on member 39 which is movable in the bore formed in body 33. The member 39 is threaded into tappet 40 and spring 41 urges tappet 40 and the seat formed on member 39 away from normal engagement with valve 37. A push rod 42 is slidably mounted in the valve body and cooperates with the cam 43 carried on piston rod 24. The clutch operating control valve member of cam operated application valve 25 is identically constructed to that just described and the parts are designated by primes to distinguish them from those parts controlling the throttle control assembly. These latter valves cooperate with cam 44. Cams 43 and 44 are so spaced that they control the operation of clutch operating cylinder and throttle control assembly in the requisite timed sequence as will be subsequently described.

Pressure fluid for the operation of clutch control cylinder 9 is obtained from the high pressure reservoir 45 which is connected to a suitable source of supply. The pressure fluid in this reservoir 45 may attain pressures as high as 125 pounds per square inch. A conduit 46 establishes communication with chamber 34' and the reservoir 45. Conduit 47 establishes communication between the chamber 35' and the clutch control cylinder 9.

Pressure fluid for actuating throttle control assembly 11 and solenoid operated shift cylinder 10 is obtained from reduced regulated pressure reservoir 48. The pressure fluid stored in this reservoir is maintained at a lower pressure than the fluid in reservoir 45 and pressure reducing valve 51 interposed between reservoirs 45 and 48 and connected by conduits 49 and 50 assures a supply of constant valve pressure fluid. This constant pressure may be, for example, 60 pounds per square inch and a regulated pressure is desirable though not essential to the assured success of the operation. When constant pressure is introduced into the solenoid operated shift cylinder 10 and the throttle control cylinder 11 assembly, it insures a constancy or identicalness of action for each application. Communication is established between chamber 34 and reservoir 48 by conduit 53 and between chamber 34 and cage 35 and throttle control assembly 11 by conduit 52. A common exhaust port 55 is provided in cam operated application valve 25 and is in direct communication with passageway 57, duct 56 formed therein and a corresponding passageway and duct (not shown) formed in the other side of the valve. This common exhaust port 55 provides the means for exhausting pressure fluid from clutch operating cylinder 9 and throttle control assembly 11.

Referring now to the operation of the system, it is assumed that the vehicle is at rest; that reservoir 45 is charged with pressure fluid at normal operating pressure; that reservoir 48 is charged with pressure fluid under the proper pressure; that valve 36' is open; that clutch control cylinder 9 is actuated and that clutch 5 is engaged. Under these conditions the engine 1 will be connected to the rear axle 2 and wheels 3 and 4 through the clutch 5 and the fluid coupling 6. If the engine and vehicle are accelerated by manually controlling the throttle by an operating device (not shown), governor 14 will close switch 19 to complete the maintaining circuit for the solenoid operated control switch 18. If the engine and vehicle are further accelerated the high speed governor 15 will be operated closing the switch 20 and completing the momentary contact circuit for solenoid operated control switch 18 closing said switch and completing the circuit to energize the shift control solenoid 16. When the shift solenoid 16 is energized, it opens valve 17, permitting pressure fluid to actuate the shift cylinder 10, moving piston 23 and rod 24 upwardly and compressing spring 22 until the synchronizing combs or balking rings are engaged.

As the rod 24 is moved upward, it causes successive engagement of the cams 43 and 44 with the proper members of cam operated application valve 25 in timed relationship, the sequence of which is as follows: Cam 44 allowed spring loaded push rod 42' to drop, thereby seating valve 36' and opening exhaust valve 37', permitting the pressure fluid holding the clutch control cylinder 9 to be exhausted to atmosphere through port 55 under the influence of spring 9' and to declutch the vehicle by releasing the pressure on clutch 5. Immediately thereafter cam 43 lifts push rod 42, seating valve 37 on the upper end of member 39 and unseating inlet valve 36, allowing pressure fluid from reservoir 48 to enter throttle control valve 11 via conduits 53, chamber 34, valve cage assembly 38 and conduit 52. This pressure fluid reacts on throttle control assembly 11 to close the throttle valve 12 and reduce the engine speed. The upward motion of the piston rod 24 is unable to continue until the synchronizing combs 27 and 28 of the overdrive permit engagement of the gearing in movable member 26 with gear 30. When synchronization is obtained, push rod 42 is permitted to be urged downward by spring 41 in response to the movement of cam 43. This latter motion permits valve 36 to reseat and valve 37 to become unseated and allow the pressure fluid from the throttle control assembly to be exhausted under the influence of spring 11' through duct 56, passageway 57 and out through port 55. The operation of the preferred throttle control assembly 11 is set forth in a companion application Serial No. 743,353, filed April 23, 1947, entitled Throttle Control Device, and discloses the desired steps and sequence in opening the throttle after which the engine will continue to drive the vehicle through the overdrive 7 with the throttle control responsive to manual operation.

If the vehicle or engine speed is decreased for any reason, the connection between the engine and final drive will be automatically remade through the clutch and fluid coupling. This connection is not established, however, when the high speed governor 15 opens switch 20 since switch 19 maintains the holding coil circuit closed for the control switch 18 until the engine or vehicle speed has decreased to a value below the minimum limit of low speed governor 14. When this value is reached, switch 19 is opened, de-energizing the solenoid control switch 18, thereby disconnecting shift solenoid 16 which permits valve 17 to be closed by the action of spring 16'. The fluid pressure in solenoid operated shift cylinder 10 is then exhausted to atmosphere through a port (not shown) and the piston rod 24 moves downward under the action of spring 22 to disconnect the overdrive and initiate the following sequence: First, the cam 43 acting on push rod 42 permits pressure fluid to again actuate the throttle control assembly to close the throttle 12 and decelerate the engine which has accelerated materially due to the fact that the vehicle load has been removed. This deceleration of the engine is momentary as push rod 42 follows over the contour of cam 43 and immediately begins the cycle of engine control previously described. As the engine is in its accelerating cycle the cam 44 engages the push rod 42', seating valve 37' and unseating valve 36' permitting pressure fluid from the reservoir 45 to enter the clutch control cylinder 9 via conduits 46, chamber 34, valve cage 38', and conduit 47, thereby re-establishing the connection between the engine 1 and the wheels 3 and 4 through clutch 5 and fluid coupling 6.

What I claim is:

1. A control system for an automotive vehicle provided with a clutch, an engine, a speed ratio varying transmission, a shiftable gear, and a throttle for controlling the engine comprising a pressure fluid motor to operate the throttle; a pressure fluid motor for operating the clutch; a pressure fluid motor for adjusting the transmission speed ratio; a first source of pressure fluid for the operation of said clutch motor; a second source of pressure fluid maintained at a constant but lower pressure than said first source for the operation of said speed ratio varying transmission motor and throttle operating motor; a governor mechanism driven by the engine; a valve for controlling the operation of the speed ratio varying transmission motor; means controlled by said governor mechanism for operating said valve; a valve for controlling the operation of said clutch motor; a valve for controlling the operation of said throttle motor; and cam means associated with said speed ratio varying transmission motor for operating the valves for said throttle and clutch motors.

2. A control system for an automotive vehicle provided with a clutch, an engine, a speed ratio varying transmission, and a throttle for controlling the engine comprising a pressure fluid motor for operating the throttle; a pressure fluid motor for operating the clutch; a pressure fluid motor provided with a piston rod for adjusting the transmission speed ratio; a first source of pressure fluid for the operation of said clutch motor; a second source of pressure fluid maintained at a constant but lower pressure than said first source for operating said speed ratio varying transmission motor and the throttle motor; a governor mechanism which includes a high speed governor and a low speed governor operable by the engine; a valve for the admission of pressure fluid from said second source to said speed ratio varying transmission motor; a circuit including a solenoid controlled by said high speed governor for opening said valve; a dual valve for admitting pressure fluid from said first source to said clutch motor and from said second source to said throttle motor; cam means formed on said piston rod for operating said dual valve; means operable by said low speed governor for opening said circuit; means for closing said first mentioned valve; and means in said speed ratio varying transmission motor for reversely operating said dual valve.

3. In a control system for an automotive vehicle having a clutch, an engine, a speed ratio varying transmission and a throttle to control the engine speed; pressure fluid means for assuming control of said throttle; pressure fluid means for operating said clutch; pressure fluid means for selecting the speed ratio; a first source of pressure fluid for actuating said means for operating said clutch; a second source of pressure fluid maintained at a constant but somewhat lesser pressure than said first source for actuating said means for operating said throttle and selecting said speed ratio; a valve for controlling the flow of fluid from said low pressure source to said speed ratio selecting means; means for closing said valve; a speed responsive means comprising a high speed and low speed responsive mechanism; a circuit including a solenoid controlled by said speed responsive means for operating said valve; a dual valve sequentially arranged for admitting pressure fluid from said high pressure source to said means for controlling said clutch and for admitting pressure fluid from said low pressure source to said means for assuming control of said throttle; a cam operatively associated with said speed ratio selecting means for controlling said dual valve; and means operable by said low speed mechanism of said speed responsive means for opening said circuit.

4. A control system for an automotive vehicle provided with a clutch, an engine, a speed ratio varying transmission, and a throttle for controlling the engine comprising a motor for operating the clutch; a motor for operating the throttle; a motor for adjusting the transmission speed ratio; means responsive to the speed of the engine for controlling the operation of the motor for the speed ratio varying transmission; a substantially constant source of pressure fluid for operating said throttle motor and said speed ratio varying transmission motor; and means controlled by the motor for the speed ratio varying transmission for controlling the operation of the throttle and clutch operating motors.

EDWARD D. JOHNSON.

REFERENCES CITED

The following references are of record in the file of this patent:

UNITED STATES PATENTS

| Number | Name | Date |
| --- | --- | --- |
| 1,911,599 | Bloxsom | May 30, 1933 |
| 2,118,978 | Maybach | May 31, 1938 |
| 2,235,943 | Mylius | Mar. 25, 1941 |
| 2,252,009 | Kenney | Aug. 12, 1941 |
| 2,272,571 | Maybach | Feb. 10, 1942 |
| 2,294,823 | Andres | Sept. 1, 1942 |
| 2,322,479 | Schjolin | June 22, 1943 |
| 2,374,869 | Leukhardt | May 1, 1945 |
| 2,395,395 | Casler | Feb. 26, 1946 |
| 2,397,883 | Peterson et al. | Apr. 2, 1946 |